United States Patent

[11] 3,622,266

[72] Inventor Helmut Laukel
 Dortmund-Berghofen, Germany
[21] Appl. No. 814,747
[22] Filed Apr. 9, 1969
[45] Patented Nov. 23, 1971
[73] Assignee Friedrich Uhde GmbH
 Dortmund, Germany
[32] Priority Apr. 13, 1968
[33] Germany
[31] P 17 67 230.9

[54] METHOD AND APPARATUS FOR REACTION HEAT RECOVERY IN CATALYTIC HIGH-PRESSURE SYNTHESIS, PARTICULARLY IN AMMONIA AND METHANOL SYNTHESIS
6 Claims, 3 Drawing Figs.

[52] U.S. Cl. .............................................. 23/1 E,
 23/199, 23/289, 23/449.5
[51] Int. Cl. .................................................. C01c 1/04,
 B01j 9/04, C07c 29/16
[50] Field of Search ............................................ 23/199,
 198, 289; 260/449.5; 23/1 E, 1 R

[56] References Cited
UNITED STATES PATENTS
3,395,982 8/1968 Didycz ........................ 23/199

Primary Examiner—Oscar R. Vertiz
Assistant Examiner—Hoke S. Miller
Attorney—Malcolm W. Fraser ABSTRACT: Method and apparatus for the recovery of reaction heat in a catalytic high-pressure synthesis process- particularly ammonia and methanol synthesis- the total flow or reactant gas being heat-exchanged against the reaction gas from the bottom catalyst layer. This flow of preheated reactant gas is subsequently divided into two streams for further heating and for reducing the temperature of the reaction gas from the top and central catalyst layers. These streams pass through the heat exchanger arranged downstream of the top and central catalyst layer, respectively.

The apparatus comprises a reactor which contains three catalyst layers arranged one above the other and two gas to gas heat exchangers arranged in the center of the central catalyst layer. These heat exchangers are connected between the catalyst layers with respect to the tube-side flow of the reaction gas. The entire flow of reaction gas passes alternately through successive catalyst layers and heat exchangers. The shell-side passes of the gas to gas heat exchangers are connected in parallel so that the entire flow of reactant gas to be heated further is distributed to these passes. The two gas streams are recombined after leaving the heat exchangers.

METHOD AND APPARATUS FOR REACTION HEAT RECOVERY IN CATALYTIC HIGH-PRESSURE SYNTHESIS, PARTICULARLY IN AMMONIA AND METHANOL SYNTHESIS

BACKGROUND OF THE INVENTION

The catalytic high-pressure synthesis for the production of ammonia and methanol is an exothermic process with considerable reaction heat yield. In the technical industrial embodiment, the reaction proceeds at pressure of 100 to 1,000 atm., at temperatures of 360° to 600° C. and with transformations of approximately 8 to 16 percent. Transformations of the synthesis gas of this height make a synthesis gas circulation necessary, the gas issuing with a temperature of approximately 500° C. from the last catalyst layer is cooled up to a temperature of +30° to −20° C., so that the largest part of the ammonia formed may be condensed and drawn off through a valve from the circulation or cycle. The nonreacted circulation gas is heated again together with fresh gas in heat exchangers to the reaction temperature necessary for the starting of the reaction—approximately 400° C. and is conveyed to the catalyst. The greatest transformation of the reaction gas to $NH_3$ takes place in a narrow temperature range in the vicinity of 500° C. The optimum reaction temperature for the transformation is, however, not constant, but changes in the reactor in dependence on the portion of $NH_3$ already transformed and contained in the gas, that is, over the catalyst filling or along the reactor, respectively, and also in dependence on the nonconstant catalyst activity. By means of different methods of the gas supply and different installations in the reactor, the endeavor is to lead off the reaction heat so that a temperature flow is attained over the catalyst filling which deviates as little as possible from the optimum reaction temperature. High transformation means low gas volume in circulation and accordingly low expenditure for condensers, apparatus and pipe-conduits, low requirement of energy for the feed of circulation gas and high yield of waste heat. The waste heat is utilized for the production of steam or preheating of feed water and thus lessens the production costs for the product.

In order to attain a high conversion and high utilization of waste heat, the most varied reactor installations and gas conduits were recommended already within the converter and in the synthesis cycle or circulation. Thus, it is for example known to fill the catalyst into pipes in the converter and to cool the pipes from the outside by means of cold circulating gas in direct current or countercurrent. It is also known to dispose in the catalyst layer or in the catalyst layers in direction of flow, pipes through which flows cold circulating gas for the cooling.

These tube heaters or furnaces have a particular type of reaction vessels and are unwieldy in operation for large units, as they reveal numerous disadvantages, as nonuniform reaction temperatures through nonuniform catalyst filling in the tube system, unfavorable heat exchanger relations or conditions upon heating of the $NH_3$ poor circulating gas and difficult filling and evacuation of the catalyst in the tubes or pipes or their intermediary chambers.

Furthermore, full-bodied furnaces are known with two and more catalyst layers, in which the carrying off of the reaction heat takes place between the layers. In this connection, the carrying off of reaction heat may take place suddenly indirectly by a cooling medium, as for example, water, or directly or indirectly by cold circulating gas.

The direct heat flow in cold $NH_3$ poor circulating gas takes place through admixture of this gas. The required devices are indeed simple, however, the content of the reacted gas in synthesis end product after the catalyst layer is greatly diluted by means of the gas admixture. Also by means of the admixture of cold circulating gas, solely a small part of the quantity of heat leaving the full-body furnace and containing gas to be cooled is made use of through preheating of cold circulating gas, so that a larger quantity of heat must be given off to the cooling water.

The disadvantages of the direct heat flow upon the indirect heat flow in colder circulating gas which has not yet been reacted is overcome by means of gas heat exchangers installed between the catalyst layers.

These intermediary heat exchangers connected in series previously both in reference to the $NH_3$ poor circulating gas as well as also to the $NH_3$ rich circulating gas have, however, the disadvantage that they, with reference to the lower temperature drop resulting from the drop in catalyst activity during the course of the operation, must be overdimensioned. By means of the overdimensioning, however, with still good catalyst activity, the $NH_3$ poor circulating gas is heated too far and thus conveyed with too high temperature to the catalyst layers, if a possibility is not provided for subsequent regulation of the operating temperature through admixture of cold gas. The admixture of cold gas has the disadvantages already mentioned and also requires an additional technical expenditure.

The installation of intermediary heat exchangers, installed beside the shells and tubes in series leads beyond this to difficulties upon reduction of the catalyst. In this connection, the first layer of catalyst is reduced still at optimum temperature, as the circulating gas in front of the first layer may be heated by means, for example, of an electric heater to the optimum reaction temperature. The second catalyst layer and particularly the third layer receive, however, a circulating with too low gas temperature for the reduction, as by means of the intermediary heat exchangers gas heat is forced to flow off. In order, however, to be able to reduce these two catalyst layers, the gas temperature in the first and subsequently in the second layer must attain a value which should be prevented as the high temperature leads to an irreversible decrease in activity of the catalyst.

The problem serving as basis for the invention is to overcome the disadvantages of the known methods and constructions and to find a solution which makes it possible to operate the ammonia or methanol synthesis converter to greater advantage, particularly to attain a temperature profile in the catalyst layers which approaches as far as possible the optimum conversion temperature and in this manner to attain an optimum recovery of reaction heat.

SUMMARY OF THE INVENTION

It has now been found that the problem permits of being solved by means of a method, in which the reaction gas flows through a reactor with several catalyst layers and enters between the catalyst layers in heat exchange with preheated fresh circulating gas, in that in accordance with the invention, the intermediary heat exchangers are connected on the tube side in series and on the shell-side parallel permitting the preheated fresh circulating gas to flow through the parallel connected heat exchanger sides, permitting the reaction gas to flow through the heat exchanger sides connected in series and divides the preheated fresh circulating gas disposed in a multiway armature outside or inside the reactor in such manner on the parallel connected intermediary heat exchanger sides, that from the reaction gas in the intermediary heat exchangers coming out of the catalyst layers constantly so much heat is taken that in the following catalyst layers the optimum reaction temperature is attained.

The streams of circulating gas guided in parallel flowing through the intermediary heat exchanger are strongly heated in dependence on the varying degrees of conversion in the individual catalyst layers to a differentiating extent and subsequently combine before the first catalyst layer at a mixing temperature, which is suitable for commencement of the reaction in the first catalyst layer.

With increasing operating time of the reactor, the catalyst activity decreases first in the catalyst layers firstly flowed through, so that in these catalyst layers the catalytic reaction and therewith also the quantity of heat developed is diminished. Correspondingly, the distribution of gas in the three-way armature is undertaken so that at the commencement of the operating time, the most reaction heat is exchanged out of the gas from the first catalyst layer and later from the second catalyst layer.

DETAILED DESCRIPTION OF PREFERRED EMBODIMENT OF THE INVENTION

Figure 1:
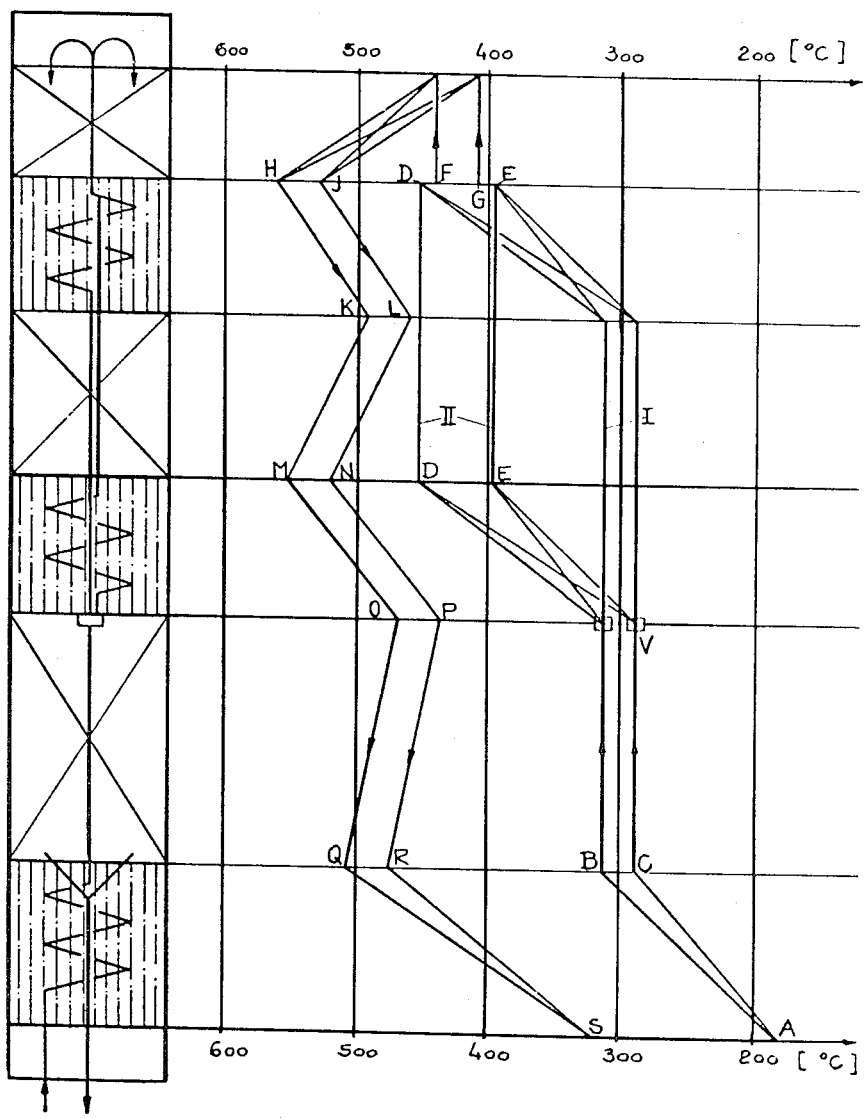
FIG. 1 is a diagram showing the possibilities of temperature control and also the guidance of the reaction on the basis of a multilayered full body converter provided with three intermediary heat exchangers.

The temperatures entered on FIG. 1 do not set forth any special instance of operation, but have solely informative character. Referring to FIG. 1, the fresh circulation gas enters with the temperature A into the lowest heat exchanger of FIG. 3 and is here heated to the temperature B or C or one lying between the same, corresponding to the starting or outlet temperature of the reaction gas in the area Q–R after the third catalyst layer. Subsequently the fresh circulating gas with the temperature in the range B–C, disregarding heating upon passage through the central tube in the third catalyst layer, reaches the three-way armature V. In this three-way armature, the gas flow is so distributed that the partial gas flow II for example after leaving the second intermediary heat exchanger, attains the temperature D or E or an intermediary value. The reaction gas from the second catalyst layer is cooled by the temperature in the range M–N to the temperature in the range O–P. The remaining gas stream I is heated in the first intermediary heat exchanger likewise to a temperature in the range D–E. If there occurs a distribution of the gas flow into equal parts, then the end temperatures become somewhat similar. If the gas current I is greater than gas current II, then the end temperature of the gas current I lies lower than that from the gas current II, and vice versa. After the combining of the two partial gas currents at the end of the first intermediary heat exchanger there results a mixing temperature in the range F–G. It is an advantage of the present invention, that the temperatures of the partial gas currents I and II may be controlled in the range D–E higher and lower than the mixing temperature in the range F–G.

The heated fresh circulating gas with the temperature in the range F–G enters in the first catalyst layer and undergoes here on account of the catalytic reaction an increase in temperature up to the temperature range H–J. With a very active catalyst, the increase in temperature will extend from the temperature G to H and upon greatly lessened activity of the catalyst from the temperature F to J. In the two following intermediary heat exchangers and the second and third catalyst layer, the temperature profile may run from H beyond K, M, O to Q or from J beyond L, N, P to R, or at times crosswise, as mentioned above. By means of the method for reaction heat recovery according to the invention, it is likewise possible to select a temperature in the range between F–G and Q–R, as desired, according to which degree of activity of the catalyst is present. By means of changing the temperature A of the fresh circulating gas, the temperature of the two gas currents I and II and therewith the gas inlet temperature in the first catalyst layer and also the temperature profile in the catalyst layers and intermediary heat exchangers may be altered to the desired degree.

The control of the entry temperature of the fresh circulating gas in the intermediary heat exchanger takes place by means of change of the outlet temperature of the reaction gas from the waste heat exchanger and therewith the inlet temperature for the attached heat exchanger, in which the fresh circulating gas is preheated.

In case for any type of reasons, for example, better synthesis gas quality or lower $NH_3$ content of the $NH_3$ poor circulating gas, by means of lower cooling means temperature, a higher conversion results, then the increased reaction heat, by means of decrease of the inlet temperature of the fresh circulating gas in the parallel connected intermediary heat exchanger, or by means of the increase in the production of energy in the waste heat exchanger, respectively, may be utilized and need not be conveyed off as useless in the cooling medium.

In addition to the advantageous regulation of the process made possible by the method according to the invention, there results a further advantage also upon reduction of the catalyst layers. By means of the multiway armature it is possible to disconnect individual intermediary heat exchangers, so that the hot reaction gas, which passes out of the first or second catalyst layer, respectively, undergoes no cooling in the subsequent intermediary heat exchangers and accordingly may reach with the required reduction temperature to the catalyst layers.

Figure 2:
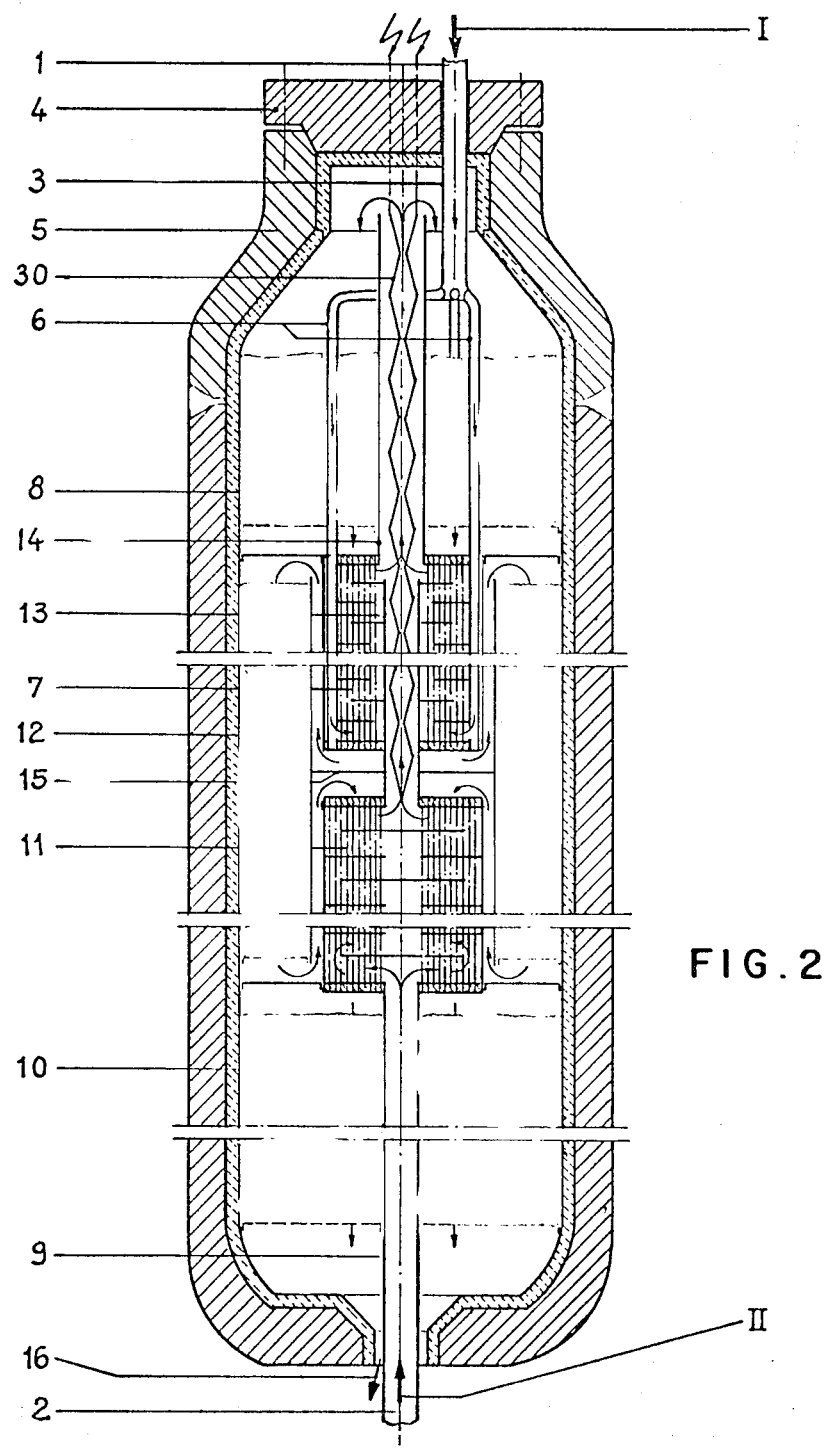
FIG. 2 is a longitudinal sectional view of a reactor for operation in accordance with the invention.
Figure 3:
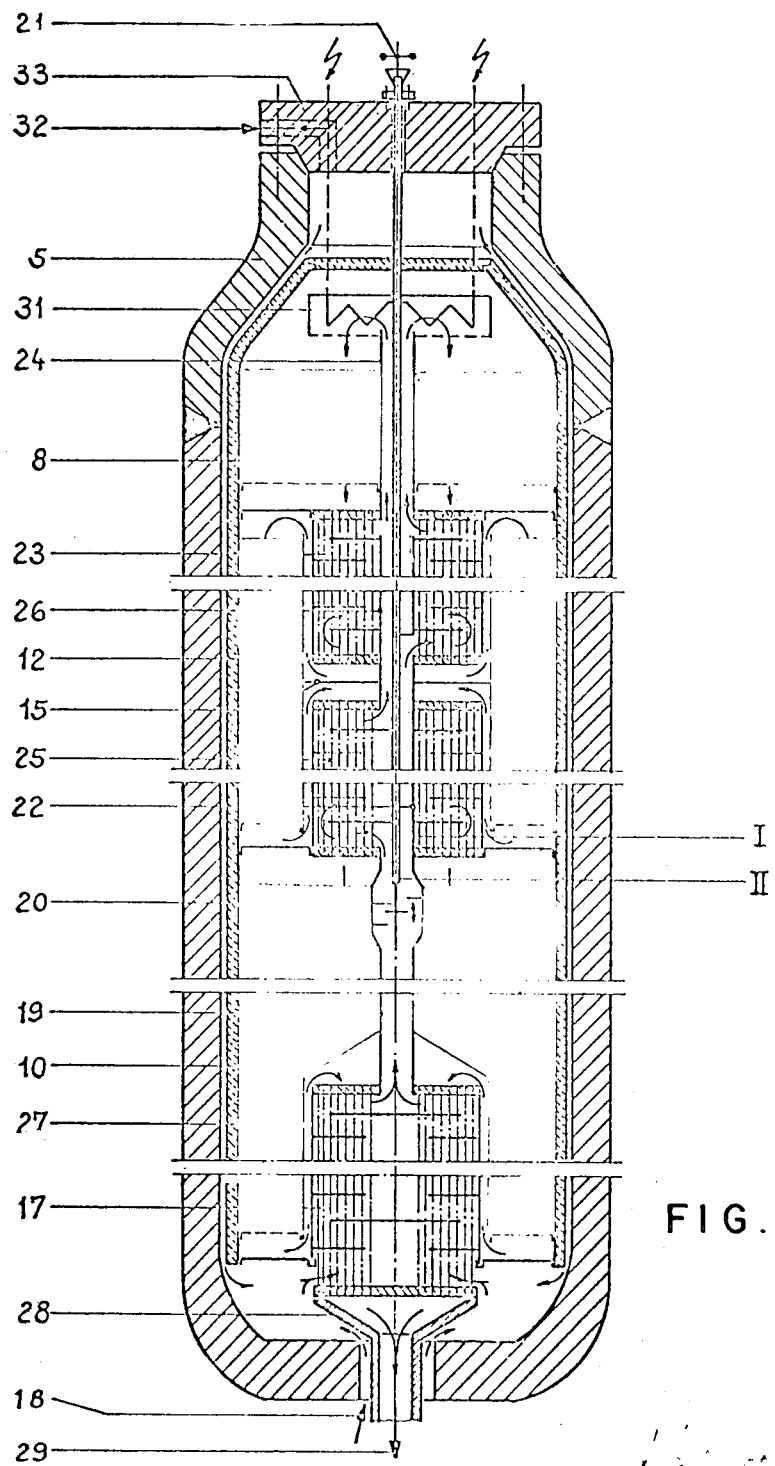
FIG. 3 is a longitudinal sectional view of an alternate form of reactor.

The constructive carrying out of the reactors required for utilization of the method according to the invention is shown in two examples in FIGS. 2 and 3.

The cold fresh circulating gas, which in known manner was preheated in gas heat exchanger outside or inside the converter, is in FIG. 2 divided outside of the converter by means of a three way armature into two gas streams I and II, which are conveyed at the points 1 and 2 to the reactor. The gas current I is converged through the feed pipe 3 through the cover 4 of the reactor 5 through distribution pipes 6 to the floor of the intermediary heat exchanger 7 and after reversal of direction in countercurrent to the reacted hot circulating gas from the first catalyst layer 8 further heated. The gas stream II is guided through the central pipe 9 in the floor of the converter through the third catalyst layer 10 to the intermediary heat exchanger 11, here heated further in countercurrent to the reacted hot circulating gas from the second catalyst layer 12, by means of the central pipe 13 in the first intermediary heat exchanger 7 conducted through the same and at the end mixed with the heated gas stream I. By means of the central pipe 14 in the first catalyst layer 8, the entire heated fresh quantity of circulating gas is conveyed upward through the first catalyst layer, and after reversal of direction guided from above into the first catalyst layer. Here a partial reaction takes place of the synthesis gas components $H_2$ and $N_2$ during development of heat and therewith an increase in temperature of the circulating gas. After leaving the first catalyst layer, the circulating gas flows through the tubes of the intermediary heat exchanger 7, where it gives off in countercurrent to the gas stream I a large part of its reaction heat to the same. After leaving the intermediary heat exchanger, the gas is conveyed through the shifting device 15 on the second catalyst layer 12 and here is heated again through further reaction. Subsequently it is conveyed through the shifting device 15 into the tubes of the intermediary heat exchanger 11 where in countercurrent to the gas stream II it again gives off a large part of its reaction heat to the same. From the intermediary heat exchanger 11, the gas enters into the third catalyst layer 10 and undergoes here again an increase in temperature through the reaction, and thereafter leaves the converter at 16.

The converter according to FIG. 3 has a heat exchanger 17 standing at the end, through which the cold circulating gas guided into the converter is preheated. By means of the central pipe or tube 19, the preheated fresh circulating gas is conveyed to the three-way armature 20, in which it is distributed to the gas currents I and II. This armature, slide-member or valve is guided through a spindle 21 outside of the converter or for example and operating cylinder inside the converter. Gas current I flows in the semitube 22 directly to the intermediary heat exchanger 23, is here heated and leaves it through the central pipe or tube 24. The gas current 11 enters directly into the intermediary heat exchanger 25, is here heated and flows then through the semitube 26 into the intermediary heat exchanger likewise into the central tube 24, where both gas streams intermix. The further conveyance of gas up to outlet from the third catalyst layer is the same as with the reactor according to FIG. 2. After leaving the third catalyst layer 10, the reaction gas is conveyed through the annular chamber 27 upwardly to the heat exchanger standing at the end, in order to flow through it on the tube side. Through the collector member 28, the gas leaves at 29 the converter. For the preheating of the fresh circulating gas upon setting into operation, the converter may be equipped with a heating device 30 in the central tube 14 according to FIG. 2, or with a heating device 31 on the end of the central tube in FIG. 3.

The converter sleeve, on account of the high-reaction temperatures in the catalyst chamber is cooled either with an inward insulation or it is cooled as shown in FIG. 3 by means of a partial current of cold circulating gas which for example through the bore 32 reaches the cover 33 in the converter, subsequently into the annular chamber which is formed by the converter sleeve and the outer insulation of the catalyst bushing, flows downwardly and mixes with the main circulating gas current, which enters at 18 into the converter.

What I claim is:

1. In a method for the recovery of reaction heat from an exothermic reaction in a catalytic high-pressure synthesis process in which the reactant gas passes through a reactor having first, second and third catalyst layers and in which said reactant gas is heated up to the starting temperature of the exothermic reaction by transfer of part of the reaction heat of the reaction gas while using the residual available reaction heat for steam generation in a waste heat boiler, the improvement which comprises heating up the entire stream of the reactant gas by heat exchange with the reaction gas from the third catalyst layer in a first heat exchanger, by further heat exchange of said reactant gas against the reactant gas from the first and second catalyst layers in second and third heat exchangers downstream of the first and second catalyst layer, respectively, the reactant gas stream being divided into two gas streams for subsequent routing through said second and third heat exchangers by means of a multiway valve installed inside or outside the reactor, and the two gas streams being combined ahead of the first catalyst layer.

2. Apparatus for practicing the method of claim 1, comprising a reaction vessel comprising a cylindrical shell, two pipes for the inlet of reactant gas passing through the shell, three catalyst layers within the shell, first and second heat exchangers within the shell each heat exchanger having a tube-side and a shell-side, said catalyst layers being arranged one above the other, the top and bottom layers occupying the entire cross-sectional area of the shell, the central layer being arranged in an annular form to leave a free cylindrical space in its center, said cylindrical space being partly occupied by said first and second heat exchangers arranged one above the other with the first one on top of the second one, a free space being left in an axial direction between said first and second heat exchangers and in a radial direction between the first and second heat exchangers and the central catalyst layer, said pipes for the inlet of reactant gas passing through the top and bottom catalyst layers and terminating on the shell-side of either the first or the second heat exchanger in the lower part thereof, a connecting pipe passing on the shell-side from the upper part of the second heat exchanger to the upper part of the first heat exchanger, a central pipe passing from the upper part of the first heat exchanger through the top catalyst layer and terminating above the top catalyst layer, gastight partitions being installed between catalyst layers and heat exchangers to ensure that the reaction gas follows an alternate route from top to bottom through catalyst layers and heat exchangers.

3. Apparatus for practicing the method of claim 1, comprising a reaction vessel comprising a cylindrical shell, one pipe for the outlet of reaction gas passing through the shell, three catalyst layers within the shell, first second and third heat exchangers within the shell, each heat exchanger having a tube-side and a shell-side, said catalyst layers being arranged one above the other, the top and bottom layers occupying the entire cross-sectional area of the shell, the central layer being arranged in an annular form to leave a free cylindrical space in its center, said cylindrical space being partly occupied by the first and second heat exchangers arranged one above the other, a free space being left in an axial direction between the first and second heat exchangers and in a radial direction between the first and second heat exchangers and the central catalyst layer, the third heat exchanger being placed centrally in the lower part of the bottom catalyst layer, said third heat exchanger having at the lower end a shell-side peripheral inlet for the reactant gas and at the upper end a central outlet pipe extending across the bottom catalyst layer and terminating in a three-way valve, said valve being provided with actuating means located outside the reaction vessel, two ducts being provided at the outlet end of the valve, one of said ducts passing to the shell-side of the second heat exchanger, the other of said ducts going to the shell-side of the first heat exchanger, a connecting pipe passing on the shell-side from the upper part of the second heat exchanger to the upper part of the first heat exchanger, a central pipe passing from the upper part of the first heat exchanger through the top catalyst layer and terminating above the top catalyst layer, gastight partitions being installed between catalyst layers and heat exchangers to ensure that the reaction gas follows an alternate route from top to bottom through catalyst layers and heat exchangers.

4. An apparatus for converting gaseous reactants to gaseous products in a catalytic exothermic process, said apparatus comprising:
   A. a tubular reactor;
   B. first, second and third reaction zones, each filled with a catalyst in order to present three reactant gas-permeable reaction zones transverse to the longitudinal axis of the tubular reactor;
   C. two heat exchangers arranged within the tubular reactor and surrounded by the catalyst present in the second catalytic reaction zone, each of the heat exchangers having a tube-side and a shell-side, the tube-sides of said heat exchangers being arranged in series with each other and in series with the reactant gasses passing through the catalytic reaction zones, the tube-side of the first heat exchanger being arranged downstream of the first catalytic reaction zone and upstream of the second catalytic reaction zone, the tube-side of the second heat exchanger being arranged downstream of the second catalytic reaction zone and upstream of the third catalytic reaction zone, the shell-sides of the two heat exchangers being arranged in parallel;
   D. means for directing parallel streams of reactant gasses at optionally different rates to the shell-sides of the two heat exchangers; said streams constituting the entire charge to the reactor,
   E. means for combining the reactant gasses issuing from the shell-sides of the two heat exchangers and
   F. means for conveying these mixed reactant gasses to the inlet side of the first catalytic reaction zone.

5. The apparatus of claim 4 further comprising a third heat exchanger installed within the reactor, wherein the total quantity of reactant gasses is passed through the shell-side of the third heat exchanger and is then split into the above said parallel streams of reactant gasses and wherein the effluent from the third catalytic zone is passed through the tube-side of the third heat exchanger.

6. An apparatus of claim 4 for converting gaseous reactants to gaseous products in a catalytic exothermic process, said apparatus comprising:
   A. A tubular reactor;
   B. a first catalytic reaction zone extending across the reactor,
   C. a second catalytic reaction zone extending across the reactor and having a central cavity adapted to receive a first and a second heat exchanger; said second catalytic reaction zone being below the first catalytic reaction zone;

D. a third catalytic reaction zone extending across the reactor and having a central cavity adapted to receive a third heat exchanger, said third catalytic reaction zone being below the second catalytic reaction zone;

E. a first heat exchanger having a tube-side and a shell-side and being positioned in the cavity of the second catalytic reaction zone, F. a second heat exchanger having a tube-side and a shell-side and being positioned in the cavity of the second catalytic reaction zone below the first heat exchanger, G. means for supplying the entire reactor input of reactant gasses to the inlet of the shell-side of the third heat exchanger, H. means for collecting the reactant gasses from the outlet of the shell-side of the third heat exchanger; and I. means for splitting these reactant gasses into a first stream and a second stream;

J. means for conveying the first stream to the inlet of the shell-side of the second heat exchanger;

K. means for conveying the second stream to the inlet of the shell-side of the first heat exchanger;

L. means for mixing the first and second streams after they leave the shell-sides of the first and second heat exchangers to produce a stream of reactant gasses of uniform temperature;

M. means for conveying these reactant gasses through:
 1. the first catalytic reaction zone, and then
 2. the tube-side of the first heat exchanger, and then
 3. the second catalytic reaction zone, and then
 4. the tube-side of the second heat exchanger, and then
 5. the third catalytic reaction zone, and then
 6. the tube-side of the third heat exchanger, and N. means for collecting the reactant gasses from the outlet of the tube-side of the third heat exchanger.

* * * * *